(12) United States Patent
Agrawal et al.

(10) Patent No.: US 7,752,446 B2
(45) Date of Patent: Jul. 6, 2010

(54) SYSTEM AND METHOD FOR DIGITAL WATERMARKING OF DATA REPOSITORY

(75) Inventors: Rakesh Agrawal, San Jose, CA (US); Gerald George Kiernan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1656 days.

(21) Appl. No.: 10/147,741

(22) Filed: May 15, 2002

(65) Prior Publication Data

US 2003/0217272 A1 Nov. 20, 2003

(51) Int. Cl.
*H04L 9/32* (2006.01)

(52) U.S. Cl. .......................... 713/176; 713/187; 726/26
(58) Field of Classification Search .................. None
See application file for complete search history.

(56) References Cited

U.S. PATENT DOCUMENTS

| | | | | |
|---|---|---|---|---|
| 5,915,027 | A | 6/1999 | Cox et al. | 380/54 |
| 5,930,369 | A | 7/1999 | Cox et al. | 380/54 |
| 6,031,914 | A | 2/2000 | Tewfik et al. | 380/54 |
| 6,061,793 | A | 5/2000 | Tewfik et al. | 713/176 |
| 6,282,299 | B1 | 8/2001 | Tewfik et al. | 382/100 |
| 6,320,965 | B1 | 11/2001 | Levine | 380/34 |
| 6,330,673 | B1 | 12/2001 | Levine | 713/176 |
| 6,813,368 | B1 * | 11/2004 | Khanna et al. | 382/100 |
| 6,865,676 | B1 * | 3/2005 | Staring et al. | 713/176 |
| 2001/0029580 | A1 | 10/2001 | Moskowitz | 713/176 |
| 2001/0054144 | A1 * | 12/2001 | Epstein et al. | 713/161 |
| 2002/0078356 | A1 * | 6/2002 | Ezaki et al. | 713/176 |
| 2006/0239501 | A1 * | 10/2006 | Petrovic et al. | 382/100 |
| 2006/0239502 | A1 * | 10/2006 | Petrovic et al. | 382/100 |
| 2006/0239503 | A1 * | 10/2006 | Petrovic et al. | 382/100 |
| 2006/0277410 | A1 * | 12/2006 | Jajodia et al. | 713/176 |

FOREIGN PATENT DOCUMENTS

| | | |
|---|---|---|
| JP | 2000209097 | 7/2000 |
| WO | WO9955089 | 10/1999 |
| WO | WO 01/59705 A3 | 8/2001 |

OTHER PUBLICATIONS

Eggers et al., "Digital Watermarking of Chemical Structure Sets", Apr. 2001, 4th Information Hiding Workshop Pittsburgh, PA, USA.*
Sion et al., "On Watermarking Numeric Sets", 2001, CERIAS Technical Report 2001-60, http://citeseer.ist.psu.edu/sion01watermarking.html, accessed Nov. 18, 2005.*

(Continued)

*Primary Examiner*—Emmanuel L Moise
*Assistant Examiner*—Jeffery Williams
(74) *Attorney, Agent, or Firm*—John L. Rogitz

(57) ABSTRACT

A method and system for enhancing security in a database by establishing a bit pattern using secret information, the pattern establishing a watermark that can be detected in a copy (authorized or not) of the database only by using the secret information.

31 Claims, 2 Drawing Sheets

OTHER PUBLICATIONS

Sion et al., "On Watermarking Semi-Structures", 2001, CERIAS Technical Report 2001-54, http://citeseer.ist.psu.edu/article/sion01watermarking.html, accessed Nov. 18, 2005.*

Sion et al., "Watermarking non-media content—Case Studies: XML & Databases", Apr. 17, 2001, http://cerias.purdue.edu/news_and_events/events/symposium/2001/posters/post_06.pdf, accessed Nov. 17, 2005.*

Forrest, SQL: A Begginer's Guide, 2002, McGraw-Hill Osborne Media, pp. 3-25.*

Definition of Tuple, Whatis.com, Mar. 27, 2002, www.whatis.com, accessed Jul. 18, 2006.*

Definition of Tuple, Webopedia.com, Jun. 13, 1998, www.webopedia.com, accessed Jul. 18, 2006.*

Sion, et al., "Rights Protection for Relational Data", 2004, IEEE Transactions on Knowledge and Data Engineering.*

Sion, et al., "Watermarking Relational Databases", Feb. 2002, CERIAS.*

Sion, et al., "Watermarking non-media content, case study: databases", Dec. 2000, http://www.cs.stonybrook.edu/~sion/research/, accessed Nov. 7, 2006.*

Sion, "Watermarking non-media content, case study: seme-structures and numbers", Nov. 2001, http://www.cs.stonybrook.edu/~sion/research/, accessed Nov. 7, 2006.*

Sion, Radu, "Research Data Files, Published Invited and Refereed Works", Sep. 1, 2006, p. 1-7, www.cs.stonybrook.edu/~sion, accessed via webarchive.org on Nov. 19, 2008.*

Microsoft Press, Microsoft Press Computer Dictionary, $3^{rd}$ ed., 1997, Microsoft Press, p. 216.*

"Concealing Data Within a Bitmap". IBM Technical Disclosure Bulletin, vol. 37, No. 02B, Feb. 1994.

"Low Cost Watermarking Based on a Human Visual Model". Delaigle et al. Proceedings of the second European Conference, Multimedia Applications, Services and Techniques. pp. 153-167. 1997.

"Digital Watermarks for Audio Signals". Boney et al. Proceedings of the International Conference on Multimedia Computing and Systems, 1996.

"Watermarking Digital Images for Copyright Protection". Ruanaidh, et al. IEE Proceedings on Vision, Signal and Image Processing. 1996.

"Resolving Rightful Ownerships with Invisible Watermarking Techniques: Limitations, Attacks, and Implications." Craver et al. pp. 573-586. IEEE, 1998.

"Watermarking, Tamper-Proofing, and Obfuscation". Collberg et al. pp. 1-34. Technical Report Mar. 2000. University of Arizona, Dept. Of Computer Science, Feb. 2000.

* cited by examiner

SYSTEM

WATERMARK INSERTION

*WATERMARK DETECTION*

SYSTEM AND METHOD FOR DIGITAL WATERMARKING OF DATA REPOSITORY

BACKGROUND OF THE INVENTION

1. Field of the Invention

The present invention relates to data repository security.

2. Description of the Related Art

The piracy of digital assets such as software, images, video, audio and text has long been a concern for owners of these assets. Protection of these assets is usually based upon the insertion of digital watermarks into the data. The watermarking software introduces small errors into the object being watermarked. These intentional errors are called marks and all the marks together constitute the watermark. The marks must not have a significant impact on the usefulness of the data and they should be placed in such a way that a malicious user cannot destroy them without making the data less useful. Thus, watermarking does not prevent copying, but it deters illegal copying by providing a means for establishing the original ownership of a redistributed copy.

The increasing use of databases in applications beyond "behind-the-firewalls data processing" is creating a similar need for watermarking databases. For instance, in the semiconductor industry, parametric data on semiconductor parts is provided primarily by three companies: Aspect, IHS, and IC Master. They all employ a large number of people to manually extract part specifications from datasheets and build parametric databases. They then license these databases at high prices to design engineers. Companies like Acxiom have compiled large collections of consumer and business data. In the life sciences industry, the primary assets of companies such as Celera are the databases of biological information. The internet is exerting tremendous pressure on these data providers to create services (often referred to as e-utilities or web services) that allow users to search and access databases remotely. While this trend is a boon to end users, it is exposing the data providers to the threat of data theft. The present invention therefore recognizes a need for identifying pirated copies of data.

As understood herein, database relations which can be watermarked have attributes which are such that changes in some of their values do not affect the applications. Real world datasets exist that can tolerate a small amount of error without degrading their usability. For example, the ACARS meteorological data, which is used in building weather prediction models, has wind vector and temperature accuracies estimated to be within 1.8 m/s and 0.5 C respectively. The present invention recognizes that errors introduced by watermarking can easily be constrained to lie within the measurement tolerance in such data. As another example, consider experimentally obtained gene expression datasets that are being analyzed using various data mining techniques. Again, the present invention recognizes that the nature of the data collection and the analysis techniques is such that changes in a few data values will not affect the results. Similarly, the customer segmentation results of a consumer goods company will not be affected if the external provider of the supplementary data adds or subtracts some amount from few transactions. Finally, consider the parametric data on semiconductor parts mentioned above. For many parameters, errors introduced by watermarking can be made to be within the measurement tolerance.

The present invention further understands that in the context of databases, watermarking poses challenges that are not necessarily present in techniques for watermarking multimedia data, most of which were initially developed for still images and later extended to video and audio sources. The differences between the two applications, as understood herein, include the following.

1. A multimedia object consists of a large number of bits, with considerable redundancy. Thus, the watermark has a large cover in which to hide. A database relation, on the other hand, consists of tuples, each of which represents a separate object. The watermark must be spread over these separate objects.

2. The relative spatial/temporal positioning of various pieces of a multimedia object typically does not change. Tuples of a relation, on the other hand, constitute a set and there is no implied ordering between them.

3. Portions of a multimedia object cannot be dropped or replaced arbitrarily without causing perceptual changes in the object. However, the pirate of a relation can simply drop some tuples or substitute them with tuples from other relations.

Because of these differences, techniques developed for multimedia data cannot be directly used for watermarking relations. Likewise, watermarking techniques for text, which exploit the special properties of formatted text, cannot be easily applied to databases. Furthermore, techniques for watermarking software have had limited success, because the instructions in a computer program can often be rearranged without altering the semantics of the program. This resequencing can, however, destroy a watermark.

The present invention has recognized the above-noted problems and provides solutions to one or more of them as disclosed below.

SUMMARY OF THE INVENTION

To address one or more of the above-noted problems, a general purpose computer is programmed according to the inventive steps herein. The invention can also be embodied as an article of manufacture—a machine component—that is used by a digital processing apparatus and which tangibly embodies a program of instructions that are executable by the digital processing apparatus to execute the present logic. This invention is realized in a critical machine component that causes a digital processing apparatus to perform the inventive method steps herein.

Accordingly, a general purpose computer is disclosed for watermarking a data repository, such as a file system, database, or other record store. The data repository has tuples, with each tuple being associated with one or more attributes and with each attribute having one or more bit positions having values. The computer establishes watermark values for a bit position in some of the attributes of some of the tuples based on private information, to establish a bit pattern which defines a watermark.

In a preferred embodiment, the tuples to be marked, the attributes to be marked within a tuple, and bit positions to be marked in an attribute, as well as specific bit watermark values, are determined based on the private information. In a preferred embodiment only bit positions in numeric attributes need be part of the watermark. The watermark values preferably are established based on a one-way hash function of at least the private information.

Additionally, the computer can determine whether a test database that is suspected as having been copied from a watermarked database in fact contains the watermark. Using the private information, the computer determines whether the watermark exists in the test data structure within a predetermined probability.

In another aspect, a general purpose computer is disclosed for determining whether a watermark exists in a test data repository having tuples. Private information is used to determine whether the watermark exists in the test data structure.

In yet another aspect, a computer program device has a computer program storage device that is readable by a digital processing apparatus. A program is on the program storage device. The program includes instructions that can be executed by the digital processing apparatus for promoting data repository security. The program includes means for determining plural tuples to be marked based on private information, and means for determining at least one attribute to be marked in each tuple to be marked. Means are provided for determining at least one bit to be marked in each attribute to be marked. Means establish a watermark value for at least each non-null bit to be marked to establish the watermark.

In still another aspect, a method for enhancing security of a data repository includes using secret information to establish a pattern of values throughout the data repository.

In another aspect, a computer program device includes means for receiving a test data structure having tuples, and means for determining for each tuple whether the tuple should have been marked based on private information. Means determine, for at least one attribute in each tuple that should have been marked, whether the attribute should have been marked. Means are provided for determining, for at least one bit in the attribute, whether the bit should have been marked. Also, means are provided for determining a watermark value for each bit that should have been marked to determine whether the test data structure contains a watermark.

In another aspect, a method includes using secret information to determine whether a pattern of values exists in a test data structure.

In another aspect, a data repository includes plural tuples. Each tuple has at least one attribute, and each attribute has at least one bit having a bit value. A bit value pattern is established among some bits based on secret information.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
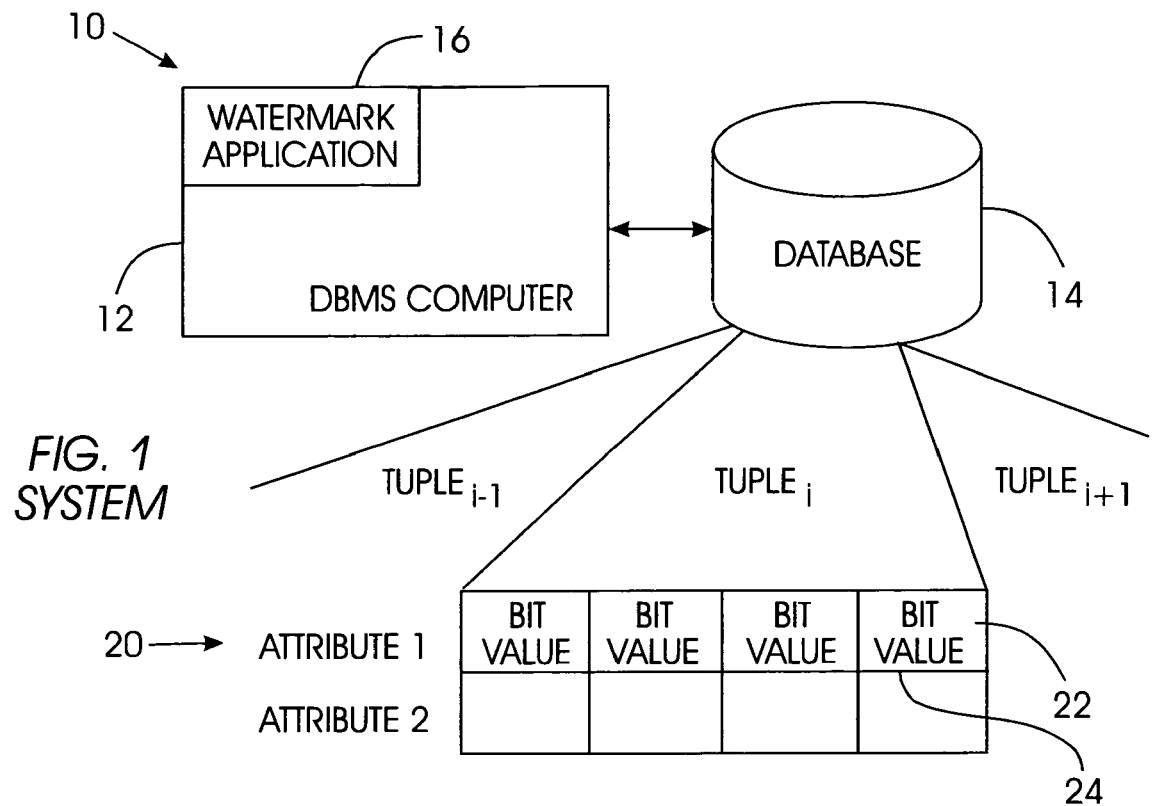
FIG. 1 is a schematic diagram showing the system of the present invention.

Referring initially to FIG. 1, a system is shown, generally designated 10. As shown, the system 10 includes a computer 12 that accesses a data structure or repository such as a file system or, in the exemplary embodiment shown in FIG. 1, a relational database 14. The computer 12 thus can host a relational database management system. A watermark application 16 can be executed on the computer 12 to undertake the logic shown in FIGS. 2 and 3.

In an exemplary non-limiting embodiment the watermark application 16 can be a user-defined function written in Java. The computer 12 may be a Windows NT Version 4.00 workstation executing DB2 UDB Version 7 using JDBC connectivity. Other types of computers, including without limitation main frame computers, laptops, desktops, and notebook computers, may be used, as well as other types of databases.

For illustration purposes, FIG. 1 shows that the data repository (e.g., the database 14) contains tuples 18, with each tuple 18 containing one or more attributes 20. In turn, each attribute 20 may include one or more data bits 22, and each bit 22 has a value 24 that, e.g., is either "0" or "1" (or, in some cases, null). It is the purpose of the present invention to establish a pattern of values, such as a pattern of bit values or less preferably a pattern of database attribute values, using secret information that consequently cannot be detected except by accessing the secret information.

With the above overview of the present architecture in mind, it is to be understood that the present logic is executed on the architecture shown in FIG. 1 in accordance with the flow charts discussed below. The flow charts herein illustrate the structure of the logic of the present invention as embodied in computer program software. Those skilled in the art will appreciate that the flow charts illustrate the structures of logic elements, such as computer program code elements or electronic logic circuits, that function according to this invention. Manifestly, the invention is practiced in its essential embodiment by a machine component that renders the logic elements in a form that instructs a digital processing apparatus (that is, a computer) to perform a sequence of function steps corresponding to those shown.

In other words, the logic may be embodied by a computer program that is executed by a processor as a series of computer-executable instructions. These instructions may reside, for example, in RAM or on a hard drive or optical drive, or the instructions may be stored on magnetic tape, electronic read-only memory, or other appropriate data storage device. In an illustrative embodiment of the invention, the computer-executable instructions may be lines of Java or compiled C++ compatible code.

Figure 2:
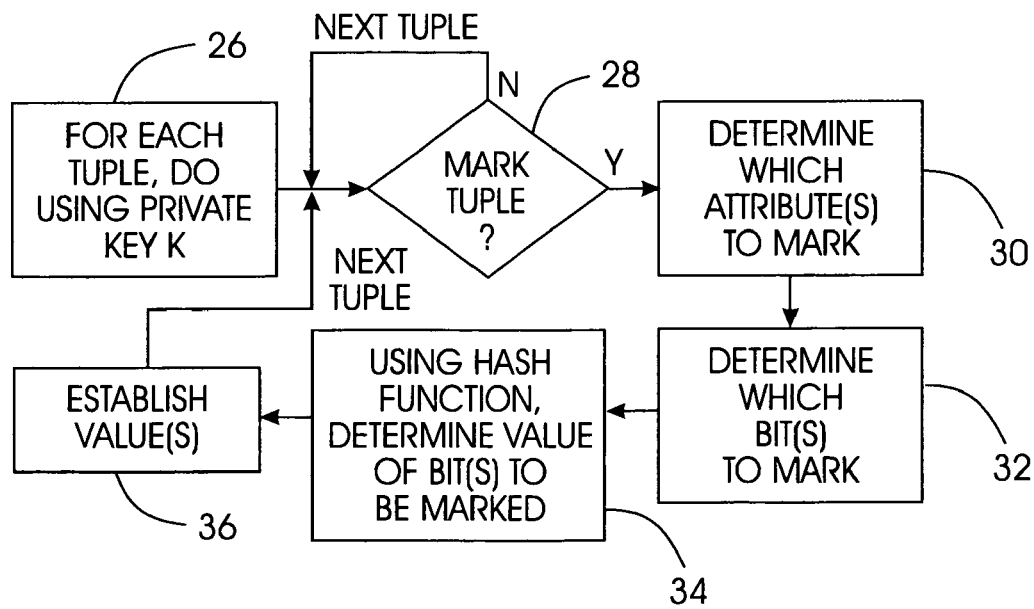
FIG. 2 is a flow chart of the logic for establishing a watermark in a database.

Now referring to FIG. 2, the logic for establishing a watermark in the database 14 can be seen. Commencing at block 26, a do loop is entered for each tuple 18 in the database 14 in which loop private information is to be used. While the preferred private information can be a "key" such as the private key of a public key-private key pair, any suitable private information, such as a string of confidential numbers, may be used.

To better understand FIG. 2, the following definitions are first provided.

Assume that the database 14 can be regarded as a database relation R whose scheme is $R(P, A_0, \ldots, A_{v-1})$ where P is the primary key attribute. For illustration, assume that all v attributes $A_0, \ldots, A_{v-1}$ are candidates for marking. That is, the database 14 has $\eta$ tuples and v is the number of attributes in the relation that are available for marking, with $\xi$ being the number of least significant bits available for marking in an attribute. Also, $1/\gamma$ represents roughly the fraction of tuples that will be marked, $\omega$ represents the number of tuples marked after the logic of FIG. 2, $\alpha$ represents the significance level of the test for determining whether a watermark exists in a test data structure as discussed further below in reference to FIG. 3, and $\tau$ is the minimum number of correctly marked tuples needed for indicating the presence of a watermark as disclosed further below in FIG. 3. Preferably, all candidate attributes for marking are numeric attributes and their values are such that changes in $\xi$ least significant bits for all of them are imperceptible. The symbol $r.A_i$ refers to the value of attribute $A_i$ in tuple r∈R, the set of available attributes.

In addition to the above, the following explanation of certain functions is provided. The presently preferred non-limiting implementation uses a one-way hash function H to operates on an input message M of arbitrary length, and H returns a fixed length hash value h, i.e., h=H(M). The preferred hash function has the additional characteristics that i) given M, it is easy to compute h, ii) given h, it is hard to compute M such that H(M)=h, and iii) given M, it is hard to find another message M' such that H(M)=H(M'). Message Digest 5 and SHA are two good choices for H.

A message authenticated code (MAC) is a one way hash function that depends on a key. Assume F is a MAC that randomizes the values of the primary key attribute r.P of tuple r and returns an integer value in a wide range. F can be seeded with a private key K that is known only to the owner of the database 14. In the preferred embodiment, the following secure MAC can be used:

F(r.P)=H(K○H(K○r.P)), wherein ○ indicates concatenation.

With the above definitions in mind, the description of FIG. 2 may be completed. The logic moves to decision diamond 28, wherein in one preferred non-limiting embodiment it is determined whether the tuple under test should be marked as follows. The tuple is designated for marking if F(r.P) mod γ equals 0. It will readily be appreciated that only the user with a knowledge of the secret information K can easily know what tuples to mark and, hence, what tuples have been marked.

If the test for marking is not met at decision diamond 28, the method loops back to get the next tuple. Otherwise, if the tuple is to be marked, the logic proceeds to block 30 to determine which attribute(s) of the tuple to mark. To do this, in one preferred non-limiting implementation the $i^{th}$ attribute is selected for marking, where attribute_index i=F(r.P) mov v. Then, moving to block 32, for a selected attribute it is determined which bit(s) to mark. To do this, in one preferred non-limiting implementation the $j^{th}$ bit of the attribute is selected for marking, where bit_index j=F(r.P) mod ξ. It is not necessary to use consecutive ξ least significant bits for marking. For instance, those bit positions in which the distribution of bit values is skewed can be omitted if desired.

A hash function is then used at block 34 to determine the value of the selected bit. This value can be referred to as a "watermark value". In one preferred non-limiting implementation, the value of the $j^{th}$ least significant bit is set to "0" if H(K○pk) is even, otherwise the bit value is "1", wherein "pk" is the attribute's primary key.

The pseudocode below is an example of the above logic. It is to be understood that the pseudocode is written in a form that simplifies disclosure, rather than in the most computationally efficient form.

```
// The private key K is known only to the owner of the database.
// The parameters γ, v, and ξ are also private to the owner.
1) foreach tuple r ∈ R do
2)   if (F(r.P) mod γ equals 0) then // mark this tuple
3)     attribute_index i = F(r.P) mod v // mark attribute A_i
4)     bit_index j = F(r.P) mod ξ // mark j^th bit
5)     r.A_j '2 mark(r.P, r.A_i, j)
6) mark(primary key pk, number v, bit index j) return number
7)   first_hash = H(K O pk)
8)   if (first_hash is even) then
9)     set the j^th least significant bit of v to 0
10)  else
11)    set the j^th least significant bit of v to 1
12)  return v
```

With the above in mind, it may now be appreciated that marking decrements some of the values of an attribute while it increments some others and leaves some unchanged. Databases usually allow attributes to assume null values. If a null attribute value is encountered while marking a tuple, the mark preferably is not applied to the null value, leaving it unchanged. In any case, in one non-limiting implementation, at block 36 the watermark value can be inserted in the bit using an SQL update function. The logic then fetches the next tuple and loops back to decision diamond 28.

As provided for in one non-limiting embodiment, whether a tuple is marked or not depends on its primary key attribute. Consequently, a tuple can be inserted without examining the markings of any other tuple. Similarly, a tuple can be simply deleted. When updating the primary key attribute of a tuple, its marking can be recomputed before storing the tuple in the database. When updating a nonprimary key attribute, nothing needs to be done if the algorithm has not selected this attribute for marking. On the other hand, if the attribute is a candidate for marking, the mark preferably can be applied to the attribute value before storing it in the database.

It may be the case that no primary key exists in the relation being watermarked. If this is the case, and assuming that the relation R consists of a single numeric attribute A, the bits of the attribute A can be partitioned into two groups. "X" bits of the value r.A are used as the "primary key substitute" of the tuple "r" and the remaining ξ bits are used for marking. If the relation has more than one attribute, one of them can be used as the substitute and the remainder for marking. The attribute that has minimum duplicates is selected to serve as the primary key substitute. The substitute can also be spread across more than one attribute to reduce duplicates.

Figure 3:
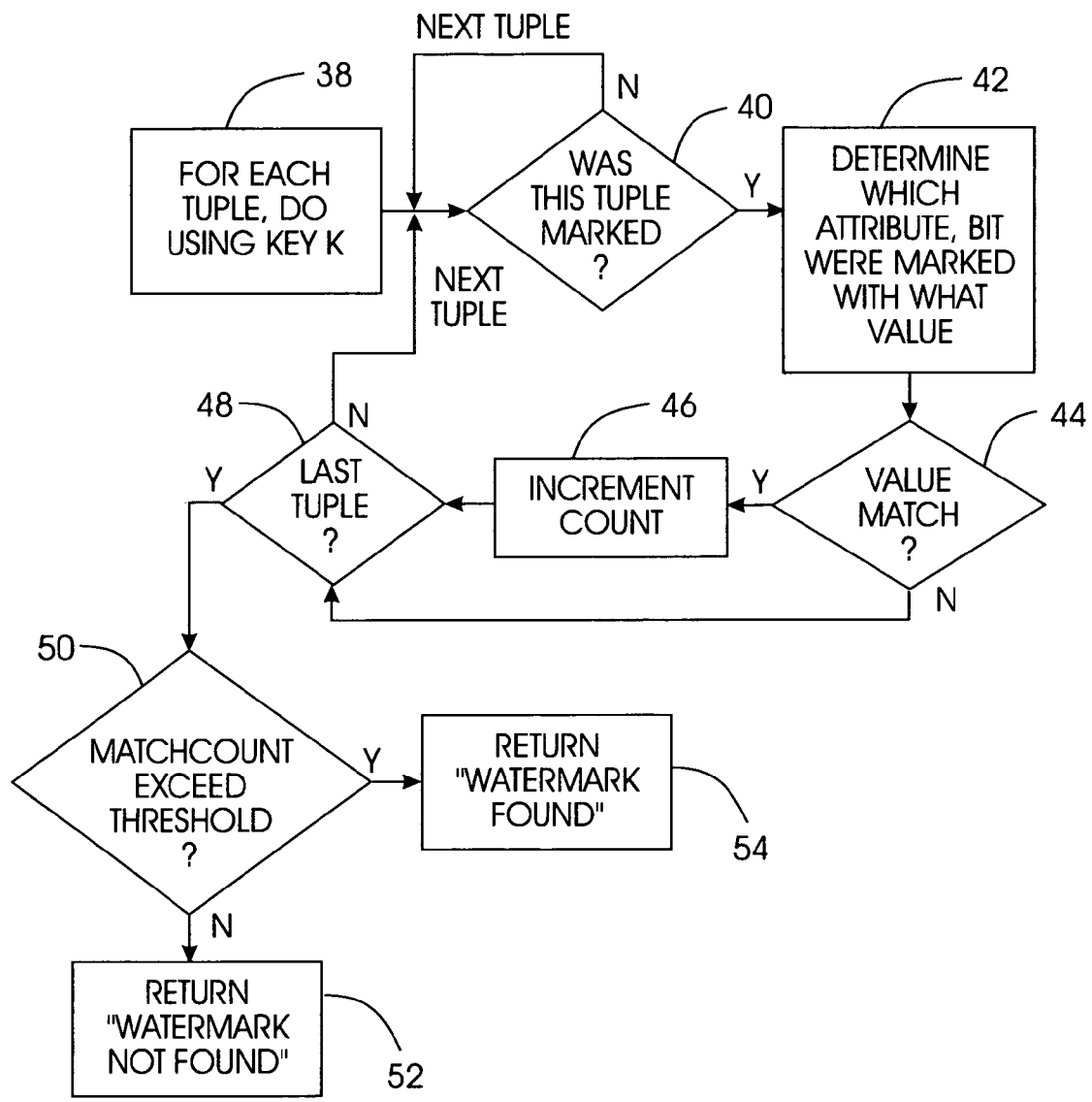
FIG. 3 is a flow chart of the logic for determining whether a watermark exists in a test data structure.

Now referring to FIG. 3, the logic by which it can be determined whether a test data structure such as all or a portion of a database might have been copied can be seen. The logic is probabilistic, as will become evident.

Commencing at block 38, a do loop is entered for each tuple in the test data structure, with the private information K being available. At decision diamond 40, it is determined whether the tuple under test was to have been marked as part of an authorized watermarking. To do this, in one preferred, non-limiting implementation it is determined whether F(r.P) mod γ equals 0. If so, the tuple should have been marked, had it been processed through the algorithm of FIG. 2. If the test for marking is not met at decision diamond 38, the method loops back to get the next tuple.

Otherwise, if the tuple should have been marked, the logic proceeds to block 42 to determine which attribute(s) of the tuple would have been marked, had the watermarking of FIG. 2 been undertaken. To do this, in one preferred non-limiting implementation the $i^{th}$ attribute is designated as having been selected for marking, where attribute_index i=F(r.P) mov v. Also, the $j^{th}$ bit is designated as having been selected for marking, where bit_index j=F(r.P) mod ξ.

Proceeding to decision diamond 44, the actual value of the bit selected at block 42 is compared to what the value should have been had the data structure been watermarked with the private information K. A count is incremented if there is a match at block 46. At decision diamond 48 it is determined whether the last tuple has been tested. If not, the logic loops back to decision diamond 40, retrieving the next tuple. Otherwise, the logic proceeds to decision diamond 50 to determine whether the count exceeds a threshold Y. If not, "watermark not found" is returned at block 52. Otherwise, "watermark found (suspect piracy)" is returned at block 54.

The pseudocode below shows one non-limiting implementation of the watermark detection logic.

```
// K, γ, v, ξ have the same values used for watermark insertion.
// α is the test significance level that the detector preselects.
1) totalcount = matchcount '2 0
2) foreach tuple is in the test data structure S do
3)    if (F(s.P) mod γ equals 0) then // this tuple was marked
4)        attribute_index i = F(s.P) mod v // attribute A_i was marked
5)        bit_index j = F(s.P) mod ξ // j^th bit was marked
6)        totalcount = totalcount + 1
7)        matchcount = matchcount + match(s.P, s.A_i, j)
8) τ = threshold(totalcount, α) //
9) if (matchcount ≧ τ) then suspect piracy
10) match(primary key pk, number v, bit_index j) return int
11)   first_hash = H(K O pk)
12)   if (first hash is even) then
13)       return 1 if the j^th least significant bit of v is 0 else return 0
14)   else
15)       return 1 if the j^th least significant bit of v is 1 else return 0
```

The detection logic of FIG. 3 can be performed using a user-defined aggregate function in accordance with the logic shown in FIG. 3, with the detection function returning a "1" if a watermark is found and otherwise returning a "0".

In the above pseudocode, the threshold subroutine to be used in line 8 can be specified as follows. Assume the logic of FIG. 3 tests ω tuples from the "suspicious" (test) database. These tests can be regarded as Bernoulli trials with a probability of ½ that the logic will successfully find the looked-for value in a specific bit position. The subroutine in line 8 returns a minimum τ such that the probability that at least τ successes in ω trials return correct results is less than α. The significance of α determines how amenable the system is to false hits, with the lower the α, the lower the chance of incorrectly identifying an innocent test database as having the watermark.

In the logic of FIG. 3, if a tuple attribute which was marked has been omitted, the tuple is ignored. Similarly, if a tuple is found whose attribute should have been marked, but the attribute has a null value, the tuple is ignored. In any case, the values of matchcount and totalcount are unaffected.

It is to be appreciated that the detection algorithm is blind, because it simply extracts bits of information from the data, without requiring access to the original data or watermark to arrive at its decision. This is important for database relations since relations are frequently updated. Without blind detection, each version of the relation would need to be kept because the original would be required for detecting a watermark.

In a particular non-limiting implementation, as mentioned above a watermark can be inserted by first retrieving tuples of R, with attributes P, A being specified in the select list. The select statement can contain the additional clause "for update of A" that allows the database engine know that the selected tuples of "r" will be updated. For each tuple "r" thus fetched, if the watermarking algorithm determines that "r" does not fall into a gap and a change is needed in the value of r.A, an update statement can be issued to mark r.A. The update statement can have a "current of cursor" clause that allows the database engine to know that the tuple to be updated is r.

As also disclosed above, watermark detection can be performed using a select statement to fetch the tuples of the suspicious database relation S, specifying the attributes P, A that are in the select list. If a result tuple "s" does not fall into a gap, the count "totalcount" is incremented. If "s" contains the mark, the count "matchcount" is also incremented. When all the tuples have been processed, the detection algorithm determines whether the probability of finding "matchcount" marks in "totalcount" tuples is within the significance level. If so, the watermark has been detected.

Depending on how tolerant the data is to errors, a value for what can be termed the "gap" γ is selected to force an unscrupulous copyist to commit large errors in attempting to erase the watermark, making the copyist's data less desirable. Gap γ is a control parameter that determines the number of tuples marked, with ω≈η/γ. A tradeoff can be made, γ against ξ, that determines the extent of error introduced in an attribute's values. That is, if less tuples are marked, the greater the extent of change that can be made to the values of marked attributes. Also, ξ is selected such that the unscrupulous copyist guesses the value too high, large errors result, whereas if he underestimates the value, the chances of his success in destroying the watermark decrease. v is likewise established to foil attacks by unscrupulous copyists.

In summary, decreasing values of α decrease the chance of false hits but increase the chance that a watermark in a copied, possibly altered database will be missed. Decreased values of γ increase the robustness of the system to attack but increase data errors in the watermarked data. Increased values of v and ξ increase robustness, but in the case of ξ, increases the value of errors in the data.

While the particular SYSTEM AND METHOD FOR DIGITAL WATERMARKING OF DATA REPOSITORY as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "at least one". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A general purpose computer for watermarking a data repository having tuples, each tuple being associated with one or more attributes, each attribute having one or more bit positions, at least some bit positions having a bit value, the computer comprising:

a hardware processor that:

establishes watermark values for at least one bit position for at least one attribute of at least some of the tuples based on private information, to establish a watermark, wherein at least one of: tuples to be marked, or an attribute to be marked within a tuple, are determined based on the private information, wherein a tuple is tested for marking using the private information and if it is to be marked;

determines which attribute(s) of the tuple to mark;

for attributes determined to be marked, determines which bit(s) of the attribute to mark;

determines a marking value for bits of an attribute selected for marking; and changes a value of a bit of an attribute to be marked to the marking value.

2. The computer of claim 1, wherein at least one of: bit position to be marked in an attribute, specific bit watermark value, are determined based on the private information.

3. The computer of claim 1, wherein all of: tuples to be marked, attribute to be marked within a tuple, bit position to be marked in an attribute, and specific bit watermark value, are determined based on the private information.

4. The computer of claim 1, wherein only bit positions in numeric attributes are part of the watermark.

5. The computer of claim 1, wherein the watermark values are established at least in part based on a one-way hash function of at least the private information.

6. The computer of claim 1, wherein the computer additionally:

receives a test data structure; and at least in part using the private information, determines whether the watermark exists in the test data structure.

7. The computer of claim 6, wherein the determining is undertaken by determining whether the watermark exists in the test data structure within a predetermined probability.

8. A general purpose computer for determining whether a watermark exists in a data repository having tuples, each tuple being associated with one or more attributes, each attribute having one or more bit positions, at least some bit positions having a bit value, the computer comprising:

at least one hardware processor that:

receives a test data structure; and at least in part using private information, determines whether the watermark exists in the test data structure, wherein at least some attributes have primary keys, and the processor examines the primary key of an attribute to determine a watermark value, wherein the processor determines for each tuple in the database whether the tuple should have been marked by determining whether $F(r.P)$ mod $ã$ equals 0 and if so determining that the tuple should have been marked, wherein F is a one-way hash function and r.P is a primary key attribute of the tuple and $1/ã$ represents a fraction of tuples marked.

9. The computer of claim 8, wherein the determining is undertaken by determining whether the watermark exists in the test data structure within a predetermined probability.

10. The computer of claim 8, wherein for a data repository from which the test data structure was derived, the computer:

establishes watermark values for at least some bit positions for some of the attributes of some of the tuples based on the private information.

11. The computer of claim 10, wherein at least one of: tuples to be marked, attribute to be marked within a tuple, bit position to be marked in an attribute, and specific bit watermark value, are determined based on the private information.

12. The computer of claim 10, wherein all of: tuples to be marked, attribute to be marked within a tuple, bit position to be marked in an attribute, and specific bit watermark value, are determined based on the private information.

13. The computer of claim 10, wherein only bit positions in numeric attributes are part of the watermark.

14. The computer of claim 10, wherein the watermark values are established at least in part based on a one-way hash function of at least the private information.

15. A computer program device comprising:

a computer program storage device readable by a digital processing apparatus; and a program on the program storage device and including instructions executable by the digital processing apparatus for promoting data repository security, the program comprising:

means for determining that a tuple should be marked if $F(r.P)$ mod $ã$ equals 0, wherein F is a one-way hash function and r.P is a primary key attribute of an $r^{th}$ tuple and $1/ã$ represents a fraction of tuples that will be marked;

means for determining at least one attribute to be marked in each tuple to be marked;

means for determining at least one bit to be marked in each attribute to be marked; and means for marking at least one bit by making the value of the bit to be a watermark value to establish the watermark.

16. The computer program device of claim 15, wherein only bit positions in numeric attributes are part of the watermark.

17. The computer program device of claim 15, wherein watermark values are established at least in part based on a one-way hash function of at least the private information.

18. A computer-implemented method for enhancing security of a data repository, comprising:

using secret information to establish a pattern of bit values throughout the data repository, wherein the act of using includes determining by a processor plural tuples in the data repository to be marked based on private information, some tuples in the repository not being marked, a tuple being marked by virtue of a value of a bit of the tuple itself being changed to a watermark value;

using marked tuples to determine whether a test database that is suspected as having been copied from a marked database in fact contains the marked tuples; wherein a watermark value is established for non-null bits to be marked as part of establishing the watermark.

19. The method of claim 18, wherein the act of using further comprises:

determining plural tuples in the data repository to be marked based on private information.

20. The method of claim 19, wherein the act of using further comprises:

determining at least one attribute to be marked in each tuple to be marked.

21. The method of claim 20, wherein the act of using further comprises:

determining at least one bit to be marked in each attribute to be marked.

22. A computer program device comprising:

a tangible computer readable storage medium comprising:

means for receiving a test data structure having tuples;

means for determining, for each tuple, whether the tuple should have been marked based on private information;

means for determining, for at least one attribute in each tuple that should have been marked, whether the attribute should have been marked;

means for determining, for at least one bit in each attribute that should have been marked, whether the bit should have been marked by virtue of having the value of the bit being changed to a watermark value; and means for determining a watermark value for each bit that should have been marked to determine whether the test data structure contains a watermark.

23. The computer program device of claim 22, wherein only bit positions in numeric attributes are tested to be part of the watermark.

24. The computer program device of claim 22, wherein watermark values are determined at least in part based on a one-way hash function of at least the private information.

25. The computer program device of claim 22, comprising:
means for maintaining a count of correct bit values; and
means for, based on the count, determining whether the watermark exists in the test data structure.

26. The computer of claim 1, wherein at least some attributes have primary keys, and the primary key of an attribute is used to establish a watermark value.

27. The computer of claim 1, wherein at least first attributes do not have primary keys, and a partition of bits in a first attribute is used to establish a watermark value.

28. The computer program device of claim 15, wherein at least some attributes have primary keys, and the primary key of an attribute is used to establish a watermark value.

29. The computer program device of claim 15, wherein at least first attributes do not have primary keys, and a partition of bits in a first attribute is used to establish a watermark value.

30. The method of claim 21, wherein at least some attributes have primary keys, and the primary key of an attribute is used to establish a watermark value.

31. The method of claim 21, wherein at least first attributes do not have primary keys, and a partition of bits in a first attribute is used to establish a watermark value.

* * * * *